3,839,359
Patented Oct. 1, 1974

3,839,359
2-ARYLAMINONITROTHIOPHENES
Karl Heinz Buchel, Wuppertal-Elberfeld, and Ingeborg Hammann, Cologne, Germany, assignors to Bayer Aktiengesellschaft, Leverkusen, Germany
No Drawing. Filed Sept. 23, 1970, Ser. No. 74,917
Int. Cl. C07d 63/12
U.S. Cl. 260—332.5 ..... 3 Claims

ABSTRACT OF THE DISCLOSURE 2-arylaminonitrothiophenes which possess arthropodicidal, especially insecticidal or acaricidal, properties. The compounds have the structure

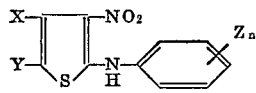

(I)

in which
X represents hydrogen, halogen or nitro,
Y represents halogen, haloalkyl or nitro,
Z represents halogen, cyano, nitro, lower alkyl, halolower alkyl, lower alkoxy, lower alkylsulphinyl, lower alkylsulphonyl, cycloalkyl, dialkylamino wherein each akyl group contains up to 6 carbon atoms or amino wherein the nitrogen is part of a saturated heterocyclic ring, as in morpholino, and
$n$ is an integer from 0 to 5.

---

The present invention relates to certain new 2-arylaminonitrothiophenes, to a process for their preparation, and to their use as insecticides or acaricides.

It is known that 2,5-dibromo-3,4-dinitrothiophene exhibits fungicidal and insecticidal properties (cf. Japanese Patent Specification 19,733/64). Furthermore, 2,5-dichloro-3,4-dinitrothiophene can be used as an insecticidal agent (cf. U.S. Patent Specification 2,691,616). The insecticidal activity of these previously known substances is, however, in many cases not satisfactory.

The present invention provides 2-arylaminonitrothiophenes of the formula

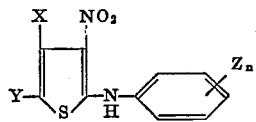

(I)

X represents hydrogen, halogen or nitro,
Y represents halogen, haloalkyl or nitro,
Z represents halogen, cyano, nitro, lower alkyl, halolower alkyl, lower alkoxy, lower alkylthio, lower alkylsulphinyl, lower alkylsulphonyl, cycloalky, diakylamino wherein each alkyl group contains up to 6 carbon atoms or amino wherein the nitrogen is part of a saturated heterocyclic ring, as in morpholino, and
$n$ is an integer from 0 to 5.

These compounds exhibit very good insecticidal and acaricidal properties.

The invention also provides a process for the production of a 2-arylaminonitrothiophene of the formula (I) in which a 2-halonitrothiophene of the formula

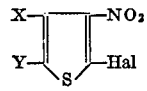

(II)

in which
Hal represents chlorine or bromine, and
X and Y have the meanings stated above, is reacted with an aniline of the formula

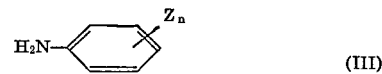

(III)

in which Z and $n$ have the meanings stated above, in the presence of an acid-binding agent.

Surprisingly, the 2-arylaminonitrothiophenes according to the invention show a considerably stronger insecticidal and acaricidal activity than the chemically close nitrothiophenes already known. Some of the active compounds according to the invention also have a bactericidal activity, and often also a fungicidal activity, for example against seed-borne and soil-inhabiting phytopathogenic fungi. The new substances therefore represent a valuable enrichment of the art.

If 2-chloro-3,5-dinitrothiophene and 4-chloroaniline are used as starting materials in the process of the invention, the reaction course can be represented by the following formula scheme:

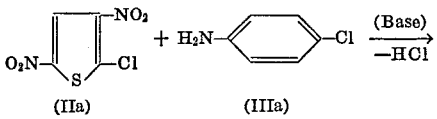

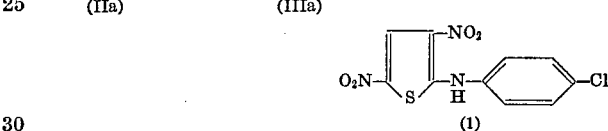

(1)

In the practice of the invention,

X stands preferably for hydrogen or nitro,
Y stands preferably for chlorine, bromine, $CF_3$ or nitro,
Z stands preferably for chlorine, bromine, fluorine, iodine, trifluoromethyl, nitro, cyano, for alkyl or alkylsulphonyl with, in each case, 1 to 3 carbon atoms, for cyclopentyl, cyclohexyl, dimethylamino, diethylamino or morpholina, and
$n$ stands preferably for 0 to 3.

When $n$ is greater than 1, Z may have different meanings.

The halonitrothiophenes of the formula (II) used as starting materials are known and preparation takes place according to described or analogous processes. (C. D. Hurd, K. L. Kreuz, J. Amer. Chem. Soc. 74, 2965 [1952]; R. Mozingo et al., J. Amer. Chem. Soc. 67, 2092 [1945].)

The reaction may be carried out in the presence of a solvent which term includes a mere diluent. All organic solvents are suitable. These include preferably polar solvents such as alcohols, for example methanol, ethanol and butanol, ketones, such as acetone, methylethyl ketone and diethyl ketone, acetonitrile, dimethyl formamide and nitromethane. The reaction can also be accomplished without diluents, the aniline of the formula (III) in fairly large excess then acting as diluent.

As acid acceptor, preferably a further equivalent of the aniline derivative (III) may be used. Depending on the basicity of the aniline, the appropriate amount of one of the customary teritary amines, for example triethylamine, dimethylaniline, N,N-dimethylbenzylamine, may also be used. Less advantageous are inorganic acid-binders such as alkali metal hydroxides or alkali metal carbonates.

The reaction temperatures can be varied within a fairly wide range. In general, the reaction is carried out at 20 to 120, preferably 30 to 100° C.

When carrying out the reaction according to the invention, 1 mole of aniline derivative (III) and 1 mole of acid-binder may be used per mole of 2-halonitrothiophene of the formula (II). The acid-binder may be replaced by a further mole of aniline. With a still larger excess of aniline, the diluent may be dispensed with. Remarkably, in the case where, in formula (II), Y stands for chlorine or bromine, and Hal likewise stands for chlorine or bromine, the compound, even with an excess of the aniline (III), reacts to give only a monoanilino derivative of the formula (I).

As already mentioned above, the new compounds are distinguished by an outstanding insecticidal and acaricidal effectiveness. Moreover, they possess only a slight toxicity to warm-blooded animals and only slight phytotoxicity. The pesticidal activity sets in rapidly and is long-lasting.

The new compounds are therefore used with success in crop protection and the protection of stored products, as well as in the hygiene field, for the control of noxious sucking and biting insects as well as mites.

To the sucking insects there belong, in the main aphids (*Aphidae*) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black fly (*Myzus cerasi*); in addition, scales and mealbugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus;* and the like.

In the case of the biting insects, above all there should be mentioned caterpillars (*Lepidoptera*) such as the diamond back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*); American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, *Orthoptera*, for example the house cricket (*Acheta domesticus*); termites such as the eastern subterranean termite (*Reticulitermes flavipes*) and *Hymenoptera* such as ants, for examples the garden ant (*Lasius niger*); and the like.

The Dijtera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (*Acari*) there are classed, in particular, the spider mites (*Tetranychidae*) such as the two-spotted spider mite (*Tetranychus telarius=Tetranychus althaeae* or *Tetranychus urticae*) and the European red mite (*Paratetranychus pilosus=Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the new compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamides, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic mineral (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005–20%, preferably 0.005–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test (plant-damaging insects)

Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from the following Table 1.

TABLE 1.—PLANT-DAMAGING INSECTS
Plutella test

| Active compounds | | Concentration of active compound in percent | Degree of destruction in percent after 3 days |
|---|---|---|---|
| (A) |  (known) | 0.2 | 90 |
| (B) |  (known) | 0.2 | 0 |
| (2) | 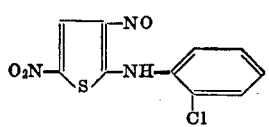 | 0.2<br>0.02 | 100<br>60 |
| (3) | 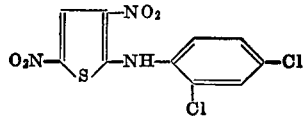 | 0.2<br>0.02<br>0.002 | 100<br>100<br>100 |

TABLE 1—Continued

| Active compounds | Concentration of active compound in percent | Degree of destruction in percent after 3 days |
|---|---|---|
| (4) O₂N—[S,NO₂]—NH—C₆H₃(Cl)(Cl) | 0.2 / 0.02 | 100 / 100 |
| (5) O₂N—[S(Br),NO₂]—NH—C₆H₃(Cl)(Cl) | 0.2 / 0.02 | 100 / 70 |
| (6) O₂N—[S,NO₂]—NH—C₆H₂(Cl)(Cl)(Cl) | 0.2 / 0.02 | 100 / 90 |
| (7) O₂N—[S,NO₂]—NH—C₆H₂(Cl)(Cl)(Cl) | 0.2 / 0.02 | 100 / 100 |
| (8) O₂N—[S,NO₂]—NH—C₆H₃(Cl)(CF₃) | 0.2 / 0.02 | 100 / 100 |
| (9) O₂N—[S,NO₂]—NH—C₆H₃(CF₃)(Cl) | 0.2 / 0.02 | 100 / 90 |
| (10) O₂N—[S,NO₂]—NH—C₆H₄(CF₃) | 0.2 / 0.02 | 100 / 90 |
| (11) O₂N—[S,NO₂]—NH—C₆H₃(CF₃)(CF₃) | 0.2 / 0.02 / 0.002 | 100 / 100 / 80 |
| (12) O₂N—[S,NO₂]—NH—C₆H₄—NO₂ | 0.2 / 0.02 | 100 / 95 |
| (13) O₂N—[S,NO₂]—NH—C₆H₃(CH₃)(CH₃) | 0.2 / 0.02 | 100 / 95 |
| (14) O₂N—[S,NO₂]—NH—C₆H₄—SO₂CH₃ | 0.2 | 100 |

EXAMPLE 2

Phaedon larvae test (plant-damaging insects)

Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compuonds, the concentration of the active compound, the times of evaluation and the results can be seen from the following Table 2.

Bean plant (*Phaseolus vulgaris*), which have a height of approximately 10–30 cm., are sprayed with the preparation of the active compound until dripping wet. These

TABLE 2.—PLANT-DAMAGING INSECTS

Phaedon larvae test

| Active compounds | Concentration of active compound in percent | Degree of destruction in percent after 3 days |
|---|---|---|
| (B) 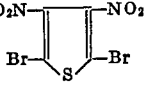 (known) | 0.2 | 0 |
| (A) 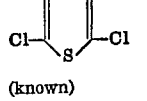 (known) | 0.2 | 20 |
| (1) 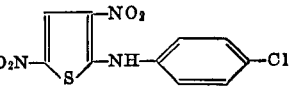 | 0.2 <br> 0.02 | 100 <br> 100 |
| (15) 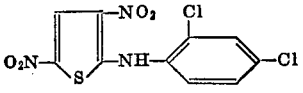 | 0.2 <br> 0.02 | 100 <br> 95 |
| (16) 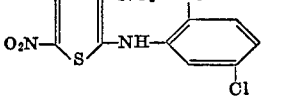 | 0.2 | 100 |
| (17) 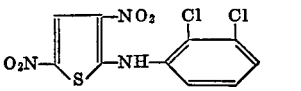 | 0.2 | 100 |
| (18) 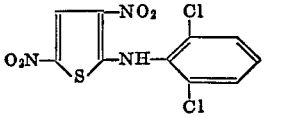 | 0.2 <br> 0.02 | 100 <br> 30 |
| (19) 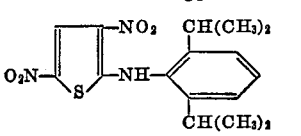 | 0.2 <br> 0.02 | 100 <br> 80 |

EXAMPLE 3

Tetranychus test (plant-damaging mites)

Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

TABLE 3.—PLANT-DAMAGING MITES
Tetranychus test

| Active compounds | | Concentration of active compound in percent | Degree of destruction in percent after 2 days |
|---|---|---|---|
| (B) | O₂N—[ring]—NO₂, Br—S—Br (known) | 0.2 | 40 |
| (4) | [dinitrothiophene]—NH—[dichlorophenyl] | 0.2 | 90 |
| (9) | [dinitrothiophene]—NH—[CF₃, Cl-phenyl] | 0.2 / 0.02 | 100 / 20 |
| (11) | [dinitrothiophene]—NH—[bis-CF₃-phenyl] | 0.2 | 90 |

The following further examples are set forth to illustrate, without limitation, the process for producing the active compounds according to the present invention.

EXAMPLE 4

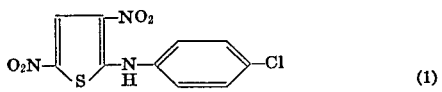

(1)

8.4 g. (0.04 mole) of 2-chloro-3,5-dinitrothiophene are dissolved in 160 ml. of ethanol, with heating. A solution of 10.3 g. (0.08 mole) of 4-chloroaniline in ethanol is then added dropwise and the mixture is heated under reflux for 1.5 hours. Suction filtration of the yellow precipitate formed is subsequently effected; the product is washed with water and ethanol and dried. There are obtained 12 g. (95% of the theory) of 2-(4'-chloroanilino)-3,5-dinitrothiophene of melting point 171–177° C. (recrystallized from a little acetone: melting point 177° C.).

EXAMPLE 5

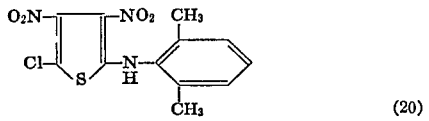

(20)

23.3 g. (0.1 mole) of 2,5-dichloro-3,4-dinitrothiophene are dissolved in 200 ml. of methanol at 50° C., 24.2 g. (0.2 mole) of 2,6-dimethylaniline are added dropwise, and heating under reflux is subsequently effected for 3 hours. The methanol is distilled off in a vacuum and washing with water is then effected. There are obtained 30.5 g. (93% of the theory) of 2-(2',6'-dimethylanilino) - 3,4 - dinitro-5-chlorothiophene of melting point 179–183° C. (recrystallized from ethanol: melting point 185° C.).

EXAMPLE 6

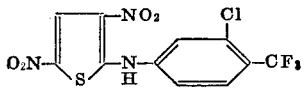

(8)

12.7 g. (0.05 mole) of 2-bromo-3,5-dinitrothiophene and 19.6 g. (0.1 mole) of 3-chloro-4-trifluoromethylaniline are dissolved in 200 ml. of n-butanol and heated under reflux for 7 hours. After cooling, the pale yellow precipitate is filtered off with suction, washed with water and evaporated to dryness in a little hot ethanol; there are then obtained 14 g. (76% of the theory) of 2-(3'-chloro-4'-trifluoromethylanilino)-3,5-dinitrothiophene of melting point 154° C.

EXAMPLE 7

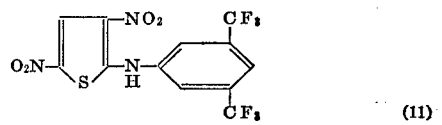

(11)

20.8 g. (0.1 mole) of 2-chloro-3,5-dinitrothiophene are suspended in 91.6 g. (0.4 mole) of 3,5-bistrifluoromethylaniline and heated to 90 to 100° C. for 10 hours. After cooling, the oily residue is taken up in ether, the excess aniline is precipitated with hydrochloric acid, suction filtration is effected and the filtrate is concentrated by evaporation. The residue is recrystallized from propanol. There are obtained 24 g. (60% of the theory) of 2-(3',5-bistrifluoromethylanilino)-3,5-dinitrothiophene of melting point 98–101° C.

EXAMPLE 8

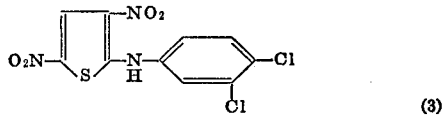

(3)

25.3 g. (0.1 mole) of 2-bromo-3,5-dinitrothiophene together with 16.2 g. of 3,4-dichloroaniline are dissolved in 250 ml. ethanol; 12.1 g. of N,N-dimethylaniline are added dropwise at boiling temperature and stirring is subsequently effected for 1 hour at 70 to 80° C. After cooling the precipitated product is washed with water, and recrystallized from acetone. 25 g. (75% of the theory) of 2-(3',4' - dichloroanilino)-3,5-dinitrothiophene of melting point 193° C. are obtained.

Preparation of the starting product 2-bromo-3,5-dinitrothiophene: 782 g. 2-bromothiophene are added dropwise over 3 hours, at 0 to 10° C., to a nitrating mixture consisting of 3.85 l. of 98%-strength nitric acid, 9 l. sulphuric acid and 3 l. oleum (containing 20% sulphur trioxide), and stirring is subsequently effected for 12 hours at 0° C. The mixture is then decomposed with 30 kg. of ice; the precipitattd, deep-yellow product is filtered off with suction, dried in a vacuum at 40° C. and recrystallized from alcohol. 494 g. of 2-bromo-3,5-dinitrothiophene of melting point 132° C. are obtained.

EXAMPLES 9–43

The compounds of the following further Examples were prepared in corresponding manner. The Table identifies the radicals set out in formula (I).

| Example number | X | Y | Z | n | M.P., °C. |
|---|---|---|---|---|---|
| 9 | H | NO₂ | 2-Cl | 1 | 182–183 |
| 10 | H | NO₂ | 2,6-(CH₃)₂ | 2 | 152 |
| 11 | H | NO₂ | 4-SO₂CH₃ | 1 | 201–202 |
| 12 | H | NO₂ | 4-NO₂ | 1 | 208–210 |
| 13 | H | NO₂ | 2,3-Cl₂ | 2 | 183–184 |
| 14 | H | NO₂ | 2,5-Cl₂ | 2 | 163 |
| 15 | H | NO₂ | 2,4-Cl₂ | 2 | 163 |
| 16 | H | NO₂ | 2,6-Cl₂ | 2 | 153 |
| 17 | H | NO₂ | 2,4-(CH₃)₂–5-NO₂ | 3 | 198 |
| 18 | H | NO₂ | 2,6-(CH(CH₃)₂)₂ | 2 | 181 |
| 19 | H | NO₂ | 4-N⟨  ⟩O | 1 | 252 |
| 20 | H | NO₂ | 3,5-Cl₂ | 2 | 172–173 |
| 21 | H | NO₂ | 4-N(CH₃)₂ | 1 | 193 |
| 22 | H | NO₂ | 3,4,5-Cl₃ | 3 | 207 |
| 23 | H | NO₂ | 3-CF₃ | 1 | 159 |
| 24 | H | NO₂ | 2,4,5-Cl₃ | 3 | 158–161 |
| 25 | H | NO₂ | 2-Cl, 5-CF₃ | 2 | 103 |
| 26 | NO₂ | Cl |  | 0 | 138 |
| 27 | NO₂ | Br | 2,6-(C₂H₅)₂ | 2 | 146 |
| 28 | NO₂ | Cl | 4,5-Cl₂ | 2 | 151 |
| 29 | NO₂ | Cl | 2-CH₃, 5-NO₂ | 2 | 138 |
| 30 | NO₂ | Br | 4,5-Cl₂ | 2 | 129–132 |
| 31 | NO₂ | Cl | 2,6-(C₂H₅)₂, 4-CH₃ | 3 | 159 |
| 32 | NO₂ | Cl | 4-SO₂CH₃ | 1 | 195 |
| 33 | NO₂ | Cl | 2-CH₃, 4-⟨ H ⟩ | 2 | 143 |
| 34 | NO₂ | Cl | 2,6-(C₂H₅)₂ | 2 | 115 |
| 35 | NO₂ | Br | 4-NO₂ | 1 | 171 |
| 36 | NO₂ | Br | 4-Cl | 1 | 130 |
| 37 | NO₂ | Cl | 2-Cl | 1 | 134–135 |
| 38 | NO₂ | Br | 2,6-(CH₃)₂ | 2 | 175 |
| 39 | NO₂ | Br | 3-CF₃ | 1 | 143–151 |
| 40 | NO₂ | Br | 3,5-(CF₃)₂ | 2 | 157–158 |
| 41 | NO₂ | Cl | 3,5-(CF₃)₂ | 2 | 159–160 |
| 42 | NO₂ | Cl | 3-CF₃ | 1 | 131–132 |
| 43 | NO₂ | Br | 2,4,5-Cl₃ | 3 | 114–116 |

It will be realized that all of the foregoing compounds contemplated by the present invention possess the desired selective pesticidal, especially arthropodicidal, i.e. insecticidal or acaricidal, properties for combating insects and acarids, and that such compounds have a low phytotoxicity and a correspondingly low mammalian toxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the conomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. A 2-arylaminothiophene selected from the group consisting of

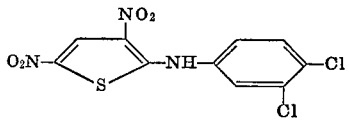

and

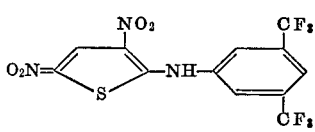

2. Compound according to claim 1 wherein such compound is 2-(3',4'-dichloroanilino)-3,5-dinitrothiophene of the formula

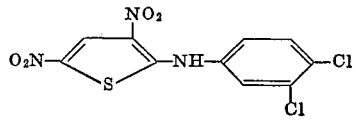

3. Compound according to claim 1 wherein such compound is 2 - (3',5' - di - trifluoromethylanilino) - 3,5-dinitrothiophene of the formula

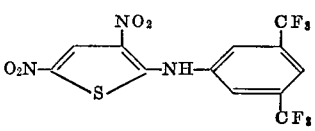

References Cited

UNITED STATES PATENTS 3,389,140   6/1968   Montzka _____ 260—286

OTHER REFERENCES

Hurd et al.: Chem. Abs. 48: 9354–5 (1954).
Blatt et al.: Chem. Abs. 52: 7269–70 (1958).
Leandri et al.: Chem. Abs. 55: 21091–2 (1961).
Spinelli et al.: Chem. Abs. 61: 5593 (1964).
Schuetz et al.: Chem. Ther. July–August 1968, 3 (4), 289–95.
Schaefer et al.: Fed. Eur. Biochem. Soc. Lett., 1970, 6 (3), 217–20.
Burger: Medicinal Chemistry (Wiley-Interscience, N.Y., 1951), pp. 72–74.

JOHN D. RANDOLPH, Primary Examiner
C. M. S. JAISLE, Assistant Examiner

U.S. Cl. X.R.

260—329 AM, 247.1 P, 239.6; 424—229, 248, 275

FO-1050
(5/69)

UNITED STATES PATENT OFFICE
CERTIFICATE OF CORRECTION

Patent No. 3,839,359          Dated October 1, 1974

Inventor(s) Karl Heinz Buchel et al     (Page 1 of 2)

It is certified that error appears in the above-identified patent and that said Letters Patent are hereby corrected as shown below:

Col. 1, line 9, insert the following:

-- FOREIGN APPLICATION PRIORITY DATA
German Application No. P 19 49 915.1 filed
October 3, 1969 --.

Col. 6, Table 1, Compound (3), delete the structural formula and substitute therefor:

"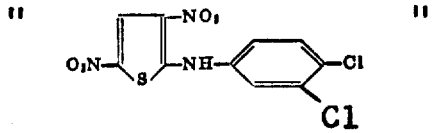"

Col. 10, lines 1-3, delete

"Bean plant (Phaseolus vulgaris), which have a height of approximately 10-30 cm., are sprayed with the preparation of the active compound until dripping wet. These".

Col. 10, line 68, before "bean" insert

"Bean plant (Phaseolus vulgaris), which have a height of approximately 10-30 cm., are sprayed with the preparation of the active compound until dripping wet. These".

PO-1050
(5/69)

UNITED STATES PATENT OFFICE
CERTIFICATE OF CORRECTION

Patent No. 3,839,359  Dated October 1, 1974

Inventor(s) _____ (Page 2 of 2)

It is certified that error appears in the above-identified patent and that said Letters Patent are hereby corrected as shown below:

Col. 11, line 61, delete "23.3" and substitute therefor -- 24.3 --.

Col. 13, line 8, correct the spelling of "precipitated".

Signed and sealed this 27th day of May 1975.

(SEAL)
Attest:

RUTH C. MASON
Attesting Officer

C. MARSHALL DANN
Commissioner of Patents
and Trademarks